(12) United States Patent
Starozhitsky et al.

(10) Patent No.: US 6,364,355 B1
(45) Date of Patent: Apr. 2, 2002

(54) SELECTIVELY HEAT TREATED AIRBAG CANISTER AND METHOD FOR MAKING SAME

(75) Inventors: Michael Starozhitsky, Buffalo Grove; Matthew J. Reiter, Northbrook, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/595,257

(22) Filed: Jun. 15, 2000

(51) Int. Cl.[7] ............................................... B60R 21/28
(52) U.S. Cl. ....................................................... 280/741
(58) Field of Search ........................... 280/728.1, 728.2, 280/741, 742

(56) References Cited

U.S. PATENT DOCUMENTS 5,779,269 A * 7/1998 Moore et al. ............... 280/741
5,975,569 A    9/1999 Starozhitsky et al.

* cited by examiner

*Primary Examiner*—Paul N. Dickson
*Assistant Examiner*—Faye M. Fleming
(74) *Attorney, Agent, or Firm*—Mark W. Croll; Donald J. Breh; Lisa M. Soltis

(57) ABSTRACT

A selectively heat treated canister for use in a vehicle airbag deployment system is configured to contain combustion materials and to contain gases produced from the combustion thereof. The canister includes a tubular body having a length and a longitudinal axis. The body is formed as at least two drawn sections. Each prior section is drawn one more time than a successive adjacent section. The canister defines a closed end and an open end. The closed end is at a least drawn section and the open end is at a most drawn section. The canister defines a heat treated region and is selectively heat treated at at least one transition zone between adjacent drawn sections to reduce crack propagation observed during testing. A method for making the canister is also disclosed.

7 Claims, 2 Drawing Sheets

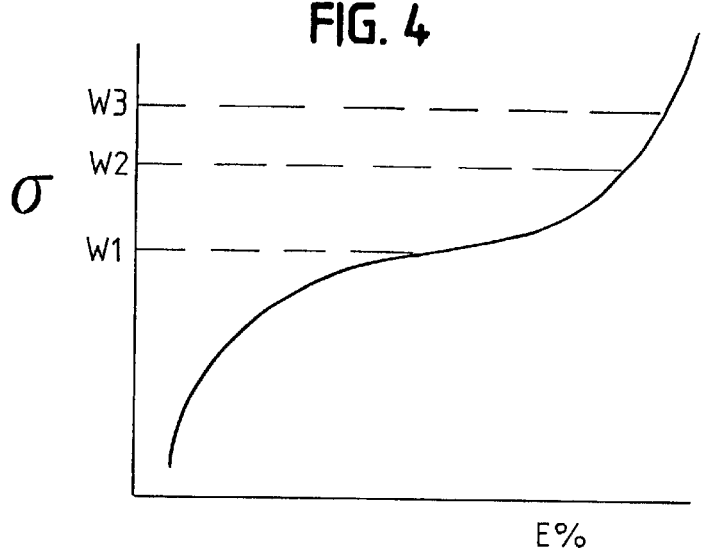
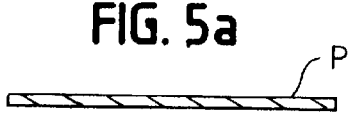
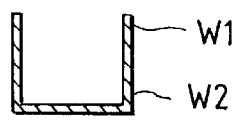
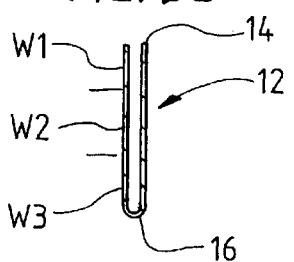

SELECTIVELY HEAT TREATED AIRBAG CANISTER AND METHOD FOR MAKING SAME

FIELD OF THE INVENTION

This invention pertains to airbag canisters. More particularly, this invention pertains to airbag canisters or housings that are selectively heat treated to enhance ductility and toughness, and a method for making such canisters.

BACKGROUND OF THE INVENTION

Airbags or supplemental restraint systems are an important safety feature in many of today's vehicles. Airbag deployment technology uses controlled combustion or an "explosion" to rapidly expand or deploy the airbag upon sensing an impact with another vehicle. This controlled explosion is contained within a canister or housing so that the rapidly expanding gases can be directed into the airbag for inflation.

Containing the controlled explosion of these chemicals is necessary for proper deployment of the airbag. The canister in which the chemicals are contained must be configured and manufactured to assure complete, controlled and predictable combustion within certain given parameters and requirements. One of these requirements is maintaining the structural integrity of the canister. That is, the canister must be configured and fabricated such that it maintains its integrity through the combustion process and subsequent airbag deployment. In testing of these canisters, in the event that a canister does rupture or yield, such rupturing or yielding must be predictable.

One currently used combustion chamber includes a substantially tubular member having two open ends. The chamber is formed from rolled and seal-welded plate stock, or is drawn as a seamless tube, such as that used for common piping. In this arrangement, however, welds are needed to seam-weld the rolled plate and/or seal-weld a plate to an open end of the tube. These welds are highly critical and as such require considerable labor and in certain instances testing to assure weld integrity throughout the combustion process and airbag deployment. It has been observed that these welds can crack or fail, thus, compromising the integrity of the canister, and possibly the operation of the airbag.

The canisters are tested to assure that they retain their structural integrity during airbag deployment. One such test is a burst test. This is a destructive-type test in which a canister is subjected to internal pressures significantly higher than those expected during normal operational use, i.e., airbag deployment. In this test, the canister is subjected to increasing internal pressures until failure.

In reviewing the burst test results and studying the test canister specimens from these tests, it has been found that failure occurs through ductile failure, brittle failure, and sometimes a combination of these two phenomena. It has been observed that in ductile fracture or failure an outturned rupture exemplified by an opened bulge (such as would be exhibited by a bursting bubble) occurs. This rupture is localized within a subject area. In a brittle fracture, on the other hand, through-wall longitudinal cracks along the length of the canister are exhibited which are indicative of a brittle zone in the material.

At times, a combination of these two failure mode can be observed. For example, a failure may occur due to ductile failure in which case a rupture or opened bulge is found. In those instances where a combination of the failure mechanisms is found, brittle cracks can propagate from the ductile, ruptured area.

Accordingly, there exists a need for an airbag canister having a high degree of structural integrity with a reduced number of welds. Preferably, such a canister is formed from relatively common carbon steel materials. Most preferably, such a canister is fabricated in a method using efficient and cost-effective parts and processes for manufacturing the canister.

SUMMARY OF THE INVENTION

A selectively heat treated canister for use in a vehicle airbag deployment system is configured to contain combustion materials and to contain gases produced from the combustion process. The canister includes a tubular body having a length and a longitudinal axis. The body is formed as at least two drawn sections. Preferably, the canister body is formed from a flat stock material that is drawn. Each prior section is drawn one more time than a successive adjacent section.

The canister defines a closed end and an open end. The closed end is at a least drawn section and the open end is at a most drawn section. The canister defines a heat treated region and is selectively heat treated at at least one transition zone between adjacent drawn sections. The combination of drawing and heat treating increases the toughness and ductility of the canister to reduce or eliminate the potential for unwanted failure modes in testing.

In a current embodiment, the canister body is formed as three drawn sections and defines a first worked zone that is drawn three times, a second worked zone that is drawn twice and a third worked zone that is drawn once. The heat treated region overlies a transition region between the second worked zone and the third worked zone.

Governmental specifications establish limitations for the material used for airbag canisters. One such limitation is that the canister material can have no more that 0.15 percent carbon. To this end, the canister can be formed from a low carbon steel material, such as AISI 1006 to 1010. The canister can also be formed from a high strength low alloy steel such as HSLA 50.

A method for making a combustion containing canister for use in an airbag deployment system includes the steps of providing a steel plate and drawing the plate. In a first drawing step, a first portion of the plate is drawn into a die in a first work step to define a first worked zone. The method further includes drawing, in a second drawing step, a second portion of the plate into the die in a second work step to define a second worked zone and to further draw the first worked zone.

Optionally, a third drawing step can be carried out in which a third portion of the plate is drawn into the die in a third work step to define a third worked zone, to further draw the second worked zone and the first worked zone, to define a canister body. This process can be carried out to form a canister body having a plurality of worked zones. A current method includes a first drawing step to define a first worked zone, a second drawing step to define a second worked zone and a third drawing step to define a third worked.

The method includes heat treating a portion of the canister body after working. Preferably, that portion of the canister body that is heat treated extends across a transition between worked zones. In a present method, the heat-treating step is carried out by induction heating, and the canister body is heat treated at a transition between the third worked zone and the second worked zone.

During burst testing, it was found that fracture of the canisters began in the least work hardened or lowest tensile strength zone and would propagate toward the end of the canister (i.e., through the work hardened zones). Heat treating at a transition zone between worked zones creates a region that absorbs the energy of the propagating crack that began in the weaker zone and stops crack propagation.

These and other features and advantages of the present invention will be apparent from the following detailed description, in conjunction with the accompanying drawings, and the appended claims.

BRIEF DESCRIPTION OF THE FIGURES

FIG. 4 is a graphical representation of the material strength shown along the ordinate as a function of the percent elongation (shown along the abscissa), and further indicating the worked zones or regions (w1, w2 and w3) of the canister, prior to heat treatment (shown along the ordinate); and FIGS. 5a–5d illustrate the steps carried out in drawing or working the canister body to define the worked zones.

DETAILED DESCRIPTION OF THE PREFERRED EMBODIMENTS

Figure 1:
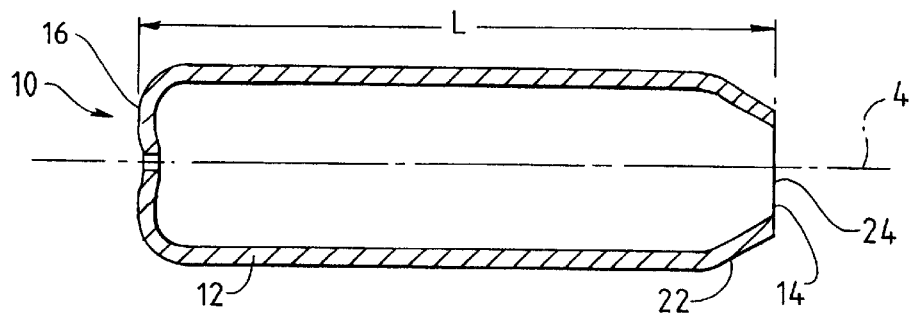
FIG. 1 is a cross-sectional view of an exemplary airbag canister embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures and in particular to FIG. 1 there is shown an exemplary airbag canister 10 that is used in an automobile airbag deployment system or assembly. The canister 10 includes a main body portion 12 having a plurality of step wise drawn regions. An end 14 of the canister is open, while an opposing end 16 of the canister is closed and is formed integral with the canister body 12. That is, the canister 10 is formed as an integral or unitary element. The closed end 16 can further include an indent or dimple 18, in which a bore 20 can be centrally formed. In an anticipated use, the bore 20 can receive a sensor or an ignition device (not shown) for the airbag assembly.

At the open end 14, the end walls, indicated at 22, can be inwardly directed or formed to define a canister throat 24. The canister body 12 has a length L and defines a longitudinal axis A about which it is symmetrical. The throat wall end 26 can be finished or machined so that it is substantially perpendicular to the longitudinal axis A.

Figure 2:
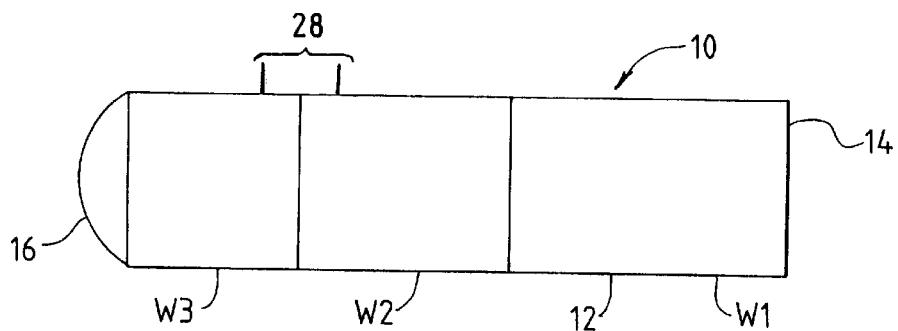
FIG. 2 is a side view of the airbag canister, illustrating the various worked zones and the heat treated region of the canister.

In a present embodiment, the canister 10 is formed by drawing, and has three distinct worked zones. These zones are shown graphically in FIG. 2 as w1, w2, and w3. As will be discussed below, the third worked zone w3 is the least worked of the three zones (i.e., worked once), while the first worked zone w1 is the most worked of the zones (e.g., worked three times).

Referring briefly to FIGS. 5a–d, in forming the canister 10, a plate P is placed over a die (not shown) having a circular opening. A press (not shown) contacts and presses the plate P into the die in a first work step, as illustrated in FIG. 5b. The press contacts the plate P at a location that ultimately becomes the closed end 16 of the canister 10. This is the first working of the first worked zone w1.

The press then contacts the closed end 16 of the canister 10 a second time, further urging it into the die, thus forming the second worked zone w2, as illustrated in FIG. 5c. At this point in the process, the first worked zone w1 has been worked or drawn twice, the second worked zone w2 has been worked or drawn once and the third worked zone has not been drawn.

As seen in FIG. 5d, to form the third worked zone, the press contacts the closed end 16 of the canister 10 a third time further urging it into the die. This works or draws the third work zone w3 once, works the second work zone w2 a second time and works the first work zone w1 a third time.

The open end 14 of the canister is, as will be recognized by those skilled in the art, at the farthest or most distant portion from the closed end 16 of the canister 10, at an end of the first worked zone w1. The closed end 16 of the canister is not worked. The working of the steel is carried out at about room temperature.

Subsequent to working, and thus forming the canister body 12, a portion of the canister, as indicated at 28, is selectively heat treated. Heat treating is performed on the canister at about the worked zone 2/worked zone 3 transition. The distance along the canister 10 at which heat treating is carried out is sufficiently large to assure that the worked zone 2/worked zone 3 (w2/w3) transition zone is completely encompassed by the heat treated area 28.

In a preferred method, heat treating is carried out using an induction heating process in which the heating element and/or the canister is rotated so as to assure that heat treatment is circumferentially evenly carried out at about the heat treating zone 28. In a present embodiment of the canister 10 and a present method for making the canister 10, heat treating is carried out by heating the canister body 12 at the transition zone 28 to a temperature sufficient to recrystallize the elongated grain structure. For example, when an AISI 1010 steel is used, a temperature of at least about 1100° F. is used for heat treating the canister.

As will be recognized by those skilled in the art, the work hardening or drawing of the body 12 elongates the grain structure. While this does, in fact, increase the hardness of the material within the drawn zone, by doing so it elongates the grain structure of the material in the drawn direction and shortens the grain structure in a direction transverse to the elongated direction. However, this work hardening results in a decrease in the ductility of the material in the work hardened region.

To this end, heat treating the material causes recrystallization of the microstructure (in the elongated direction) and likewise widens the grain structure (transverse to the direction in which it was elongated) in the heat treated region. Thus, it has been found that heat treating increases the toughness and ductility in the heat treated area. Heat treatment is carried out at a temperature that is sufficient to recrystallize the grain structure, and is carried out for a period of time sufficient to recrystallize the grain structure throughout the thickness of the material, i.e., through the wall of the canister.

It has also been observed that canisters that have been drawn and have not been heat treated are susceptible to a brittle failure mechanism, which failure mechanism is unacceptable in airbag manufacture. In a brittle fracture failure, the canister fractures from the initial point of yield up to and through the canister wall at the open end 14 of the canister 10. In contrast, a ductile fracture mechanism, which is acceptable in airbag canister applications, is manifested by yielding of the canister in a localized area that does not extend to and through the canister wall at the open end 14 of the canister 10. It has been observed that canisters 10 that are made in accordance with the present invention, which have been drawn in a stepped manner (e.g., w1, w2, w3), and which have been heat treated in the transition zone 28 between the second and third worked zones w2/w3 are susceptible substantially only to ductile fracture failure under the required pressure conditions.

In a current embodiment of the canister 10, one material that that has been found to be acceptable for manufacture of the canister 10 is an AISI 1006–1010. It has also been found that a high strength low alloy material (e.g., HSLA 50) which has a yield strength of about 50 ksi is also suitable for the canister 10 material. In a preferred method, the canisters are formed from a steel having an AISI 1010 designation and are heat treated for a period of about 25 seconds with a 5 kw power source, and are heated to a temperature of at least about 1100° F. When an HSLA 50 steel is used, a temperature of at least about 1150° F. is used for heat treating the canister.

The following examples illustrate various characteristics of the heat-treated airbag canister.

EXAMPLE 1

Figure 3:
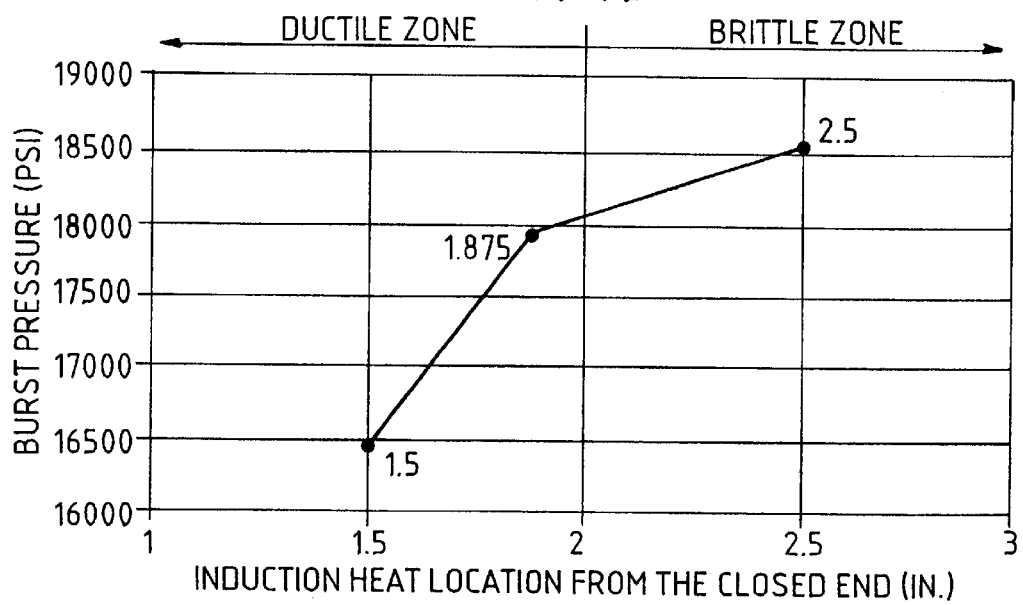
FIG. 3 is a graphical representation showing the burst pressure in pounds per square inch (psi) (shown along the ordinate), as a function of the length along the canister, from where the failure propagated (shown along the abscissa), and further indicating the induction heat location along that length and the zone in which failure occurred and the failure mechanism exhibited.

A sample of the canisters made from HSLA 50 were examined to determine the burst pressure and failure mode at various induction heat-treated locations, measured as distances along the length of the canister. The results of these tests are shown graphically in FIG. 3, in which the burst pressure is plotted against the induction heat location from the top of the canister in inches. As can be seen from the figure, within the ductile zone, that is up to about 2 inches from the closed end of the canister, a burst pressure of about 18,000 pounds per square inch (psi) was exhibited. Within the brittle zone, at 2½ inches from the closed end of the canister, the burst pressure exceeded 18,500 psi. This test was carried out at a temperature of −40° F. and at room temperature (about 72° F.).

EXAMPLE 2

Two groups of canisters were subjected to burst tests in order to compare the burst pressure of various samples. Referring first to Table 1, samples 1–2 were not heat treated. Samples 3–11 were heat treated for the time (duration) shown in the column entitled "Induction Time." The remaining columns, namely, induction heater power, burst pressure test temperature, burst pressure and failure mode are straight-forward and will be readily understood by those skilled in the art. The location column indicates the failure or crack initiation location observed following testing. Tables 1 and 2, below, illustrate the results of these tests for 6 inch samples and 9 inch samples, respectively.

TABLE 1

Burst Pressure Tests for Six Inch Canisters, STEEL HSLA50 Heat Treated and Non-Heat Treated

| Sample No. | Induction Time (sec.) | Temperature (° F.) | Burst (psi) | Failure | Location (in. from top) |
|---|---|---|---|---|---|
| 1. | As-Is | Room | 17927 | Brittle | — |
| 2. | As-Is | −40 | 18410 | Brittle | — |
| 3. | 23 | Room | 16621 | Ductile | 1.5 |

TABLE 1-continued

Burst Pressure Tests for Six Inch Canisters, STEEL HSLA50 Heat Treated and Non-Heat Treated

| Sample No. | Induction Time (sec.) | Temperature (° F.) | Burst (psi) | Failure | Location (in. from top) |
|---|---|---|---|---|---|
| 4. | 23 | Room | 16660 | Ductile | 1.5 |
| 5. | 23 | −40 | 16875 | Ductile | 1.5 |
| 6. | 23 | −40 | 17411 | Ductile | 1.5 |
| 7. | 26 | −40 | 15886 | Ductile | 1.5 |
| 8. | 25 | −40 | 16481 | Ductile | 1.5 |
| 9. | 25 | −40 | 18576 | Brittle | 2.5 |
| 10. | 25 | −40 | 17967 | Ductile | 1 ⅞ |

TABLE 2

Burst Pressure Tests for Nine Inch Canisters, STEEL HSLA50 Heat Treated and Non-Heat Treated

| Sample No. | Induction Time (sec.) | Temperature (° F.) | Burst (psi) | Failure | Location (in. from top) |
|---|---|---|---|---|---|
| 11. | As-Is | Room | 17198 | Brittle | — |
| 12. | 25 | Room | 15954 | Ductile | 2 |
| 13. | 25 | Room | 15963 | Ductile | 2.1 |
| 14. | 25 | Room | 17890 | Ductile | 2.1 |
| 15. | 25 | −40 | 14876 | Ductile | 1.5 |
| 16. | 25 | −40 | 17175 | Ductile | 2.1 |
| 17. | 25 | −40 | 16996 | Ductile | 2.1 |

It is first noted from the results that heat treating the canisters 10 shifts the failure mechanism from brittle fracture or failure to ductile failure. As set forth above, ductile failure is manifested by a localized rupturing of the canister, vis-à-vis brittle failure which results in a through open end-wall 26 split of the canister 10. Thus, heat treating provides a ductile mode of failure during burst testing. It will also be recognized by those skilled in the art that the heat treated region prevented or stopped propagation of the failure beyond the transition zone, thus limiting failure to a localized region.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A canister for use in a vehicle airbag deployment system, the canister configured to contain combustion materials and to contain gases produced from the combustion thereof, the canister comprising a tubular body having a length and a longitudinal axis, the body being formed as at least three drawn sections, each prior section being drawn one more time than a successive adjacent section, the canister defining a closed end and an open end, the closed end being at a least drawn section and the open end being at a most drawn section, the canister defining a heat treated region and being selectively heat treated at at least one transition zone between adjacent drawn sections.

2. The canister in accordance with claim 1 wherein the body is formed as three worked sections, defining a third worked zone being drawn three times, a second worked zone being drawn twice and a first worked zone being drawn once.

3. The canister in accordance with claim 2 wherein the heat treated region overlies a portion of the second worked zone and a portion of the third worked zone.

4. The canister in accordance with claim 1, wherein the canister is formed of carbon steel.

5. The canister in accordance with claim 4, wherein the carbon steel has an AISI designation of about AISI 1006 to 1010.

6. The canister in accordance with claim 1, wherein the canister is formed of a high strength low alloy steel.

7. The canister in accordance with claim 4, wherein the high strength low alloy steel has a designation of HSLA 50.

* * * * *